United States Patent [19]

Bonney

[11] 4,314,985

[45] Feb. 9, 1982

[54] RECOVERY OF MAGNESIUM AS MAGNESIUM HYDROXIDE FROM SEA WATER

[75] Inventor: Oren V. Bonney, White House Station, N.J.

[73] Assignee: Amstar Corporation, New York, N.Y.

[21] Appl. No.: 125,253

[22] Filed: Feb. 27, 1980

[51] Int. Cl.³ .............................................. C01F 5/22
[52] U.S. Cl. ..................................... 423/636; 423/164
[58] Field of Search ............... 423/164, 169, 636, 639; 23/298, 301, 304

[56] References Cited

U.S. PATENT DOCUMENTS

| 2,893,840 | 7/1959 | Vettel et al. | 23/301 R X |
| 3,128,248 | 4/1964 | Suzuki | 423/164 X |
| 3,523,889 | 8/1970 | Eis | 210/46 X |

FOREIGN PATENT DOCUMENTS

| 121345 | 4/1946 | Australia | 423/639 |
| 549492 | 11/1942 | United Kingdom | 423/164 |
| 558882 | 1/1942 | United Kingdom | 423/164 |
| 587052 | 4/1947 | United Kingdom | 423/164 |
| 635781 | 4/1950 | United Kingdom | 423/164 |
| 451627 | 11/1974 | U.S.S.R. | 423/636 |

*Primary Examiner*—G. O. Peters
*Attorney, Agent, or Firm*—Cooper, Dunham, Clark, Griffin & Moran

[57] ABSTRACT

Disclosed is a process for producing and then rapidly recovering magnesium hydroxide from an aqueous liquid containing magnesium ion. The magnesium hydroxide is produced by treating the aqueous liquid with lime. The particles of magnesium hydroxide are then recovered from the liquid by causing rapid agglomeration and separation of the magnesium hydroxide particles.

8 Claims, No Drawings

RECOVERY OF MAGNESIUM AS MAGNESIUM HYDROXIDE FROM SEA WATER

BACKGROUND OF THE INVENTION

This invention relates to a process for producing and then rapidly recovering magnesium hydroxide from an aqueous liquid, such as sea water and the like, which contains magnesium ion.

The invention has particular application to the extraction of metallic magnesium from sea water. As is well known, magnesium is the second-most abundant metal in sea water. Sea water contains about 0.13% magnesium in the form of magnesium ion. This is considered a virtually limitless source of magnesium. An electrolytic process is used to obtain metallic magnesium from sea water. In this process, sea water is pumped into large settling tanks where it is mixed with lime (calcium oxide). The lime converts the magnesium ion into insoluble magnesium hydroxide which is separated from the liquid. The hydroxide is then treated with hydrochloric acid to produce a magnesium chloride solution. The water is evaporated, and the dry magnesium chloride is fed to electrolytic cells which break it up into metallic magnesium and chlorine.

Heretofore, techniques developed for separating insoluble magnesium hydroxide from sea water have generally involved the use of large, slow-acting settling chambers. Principal difficulties with prior art separating techniques and apparatus include the prolonged periods of time needed to effect settling or separating and the relatively large capacity and expense required for the separation equipment. For example, in a typical commercial process, magnesium hydroxide is separated from sea water by sedimentation in "clarifiers" which are up to 300 feet in diameter. These clarifiers may be used to process 10,000 gallons of sea water per minute. This corresponds to a rate of 0.14 gallons per minute per square foot (g.p.m./sq. ft.) of clarifier area. Often, several clarifiers are operated in combination in order to process up to 25,000 gallons of sea water per minute. In these commercial processes, the underflow from the final clarifiers contains about 25% suspended solids, while the overflow frequently contains over 100 parts per million suspended solids.

SUMMARY OF THE INVENTION

The present invention provides a process for first producing magnesium hydroxide from aqueous liquids which contain magnesium ion, and then rapidly recovering the magnesium hydroxide from the liquid for further processing. By means of the present invention, magnesium hydroxide may be extracted from sea water at rates almost fifteen times as great as those previously achieved. In addition, the overflow returned to the ocean contains less than half the suspended solids present in the overflow from conventional processes. This is important because of the increasingly severe constraints being placed on the permissible levels of suspended solids in the discharge stream.

In accordance with the present invention, an aqueous liquid which contains magnesium ion, such as sea water and the like, is treated with lime. The lime reacts with the magnesium ion to form an aqueous suspension of magnesium hydroxide particles. In the next step of the process, a settling aid or flocculating agent is added to the aqueous suspension in order to bring about an initial, at least partial agglomeration of the solid magnesium hydroxide particles. The resulting slurry is then introduced as influent feed into a separation vessel beneath the upper boundary of a settling region of the separation vessel. The settling zone contains a previously formed slurry which has a relatively higher concentration of magnesium hydroxide agglomerates than is present in the influent feed. The path of the slurry introduced as influent feed is then deflected radially and outwardly in order to increase contact between the magnesium hydroxide particles in the influent feed and the magnesium hydroxide agglomerates already present in the settling zone. This increased contact causes additional and rapid agglomeration of magnesium hydroxide particles and the agglomerates quickly settle to the bottom of the separation vessel. A dense liquid solids slurry fraction is continuously removed from the separation vessel at a point near the bottom of the settling zone, at a rate which maintains the upper boundary of the settling zone relatively stationary. In the final step, the magnesium hydroxide agglomerates are separated by any conventional means from the dense liquid solids slurry fraction withdrawn from the separation vessel.

A particularly satisfactory apparatus for carrying out the above-described process is an apparatus provided with a bottom or top central inlet feed pipe similar to, and operated in the manner as the clarifier described in U.S. Pat. No. 3,523,889.

DETAILED DESCRIPTION OF THE INVENTION

In step 1 of the process, an aqueous liquid containing magnesium ion is treated with lime. The lime, upon hydration, reacts with the magnesium ion according to the following chemical equation:

$$Ca(OH)_2 + Mg^{2+} = Ca^{2+} + Mg(OH)_2 \qquad (1)$$

Because of its low solubility in water, magnesium hydroxide precipitates from the solution in the form of minute particles. The minute particles do not settle to the bottom of the vessel but remain suspended in the liquid because of Brownian motion. Such a suspension of magnesium hydroxide particles in water is commonly known as milk of magnesia.

While any aqueous liquid which contains magnesium ion may be used in this first step, sea water is an especially suitable source of magnesium ion. Naturally occurring brines provide another suitable supply of magnesium ion-containing liquid. The lime may be supplied by any convenient lime-containing substance. When calcined dolomite (CaO.MgO) is used, the reaction proceeds as follows:

$$Ca(OH)_2.Mg(OH)_2 + Mg^{2+} = Ca^{2+} + 2Mg(OH)_2 \qquad (2)$$

It will be observed that in the above reaction, both the calcined dolomite and the aqueous liquid furnish magnesium for the magnesium hydroxide. Thus, the invention may be practiced efficiently and economically with calcined dolomite as one of the reactants.

In step 2 of the process, a settling aid or flocculating agent is added to the magnesium hydroxide suspension. The settling aid or flocculating agent causes an initial, at least partial, agglomeration of the suspended magnesium hydroxide particles and a slurry is thereby formed. Settling aids or flocculating agents are described in U.S. Pat. No. 3,523,889. The settling aids disclosed therein include the group of polyelectrolytes, and particularly the group of organic copolymers of acrylamide having molecular weights estimated at between two and three million. It should be understood that any settling or flocculating agent which produces magnesium hydroxide agglomerates to a substantial degree can be employed in the process. However, the group of anionic polyelectrolytes and particularly the group of anionic, high molecular weight polyacrylamide resins work best. Particular polyacrylamide resins of this type useful in carrying out the invention include a number of commercially available products. Betz 1110 and 1410, manufactured by Betz Manufacturing Corp.., and Calgon 2400, manufactured by Calgon Corp., have given satisfactory results.

Preferably, the settling aid is added to the suspension continuously in the feed line leading to the separation vessel. It is generally desirable to add the settling aid in the form of a dilute aqueous solution at a point in the feed line which insures its proper dispersion. The rate at which the settling aid is continuously added to the suspension should be metered so as to produce the most effective final dosage. While the most effective dosage depends on a variety of factors, such as the nature of the settling aid, it has been found that dosages ranging from 1.0 to 3.0 parts per million by weight of an anionic polyelectrolyte work best.

In step 3 of the process, the resulting slurry is introduced as influent feed into a separation vessel beneath the upper boundary of a settling zone contained therein. The settling zone is filled with a previously formed liquid slurry having a higher concentration of agglomerated solid magnesium hydroxide than is present in the influent feed. Preferably, the previously formed liquid slurry is gently agitated by the influent feed as it is introduced into the midst of the settling zone. No additional agitation is required.

In step 4 of the process, the path of the influent feed is deflected radially and outwardly in order to increase contact between the magnesium hydroxide particles in the influent feed and the magnesium hydroxide agglomerates already present in the settling zone. The effect of this intermixing is to cause additional agglomeration and coalescence of the solids into relatively large agglomerates which settle rapidly to the bottom of the separation vessel. A baffle or other arresting means positioned closely adjacent to the influent feed line may be used to deflect the path of the influent feed.

In the next step of the process, a dense liquid solids slurry fraction is continuously removed from the separation vessel. This fraction is removed at a point near the bottom of the settling zone and at a rate which maintains the upper boundary of the settling zone substantially stationary.

In the final step of the process, the magnesium hydroxide agglomerates are separated from the dense liquid solids slurry fraction. The separation may be accomplished by any conventional method, for example, by evaporation. A preferred method is filtration since this method is swifter and more efficient than evaporation.

The following examples are presented in further illustration of the process of this invention.

EXAMPLE 1

Influent feed containing magnesium hydroxide particles and flocculating agent for agglomeration of the magnesium hydroxide particles is introduced into the settling zone of a clarifier along the lines described in U.S. Pat. No. 3,523,889 through a standpipe located in the center of the settling zone. The flocculating agent is added to the influent feed a suitable distance, e.g. about 5 feet from the influent feed entry into the settling zone. The influent feed may also usefully include a static mixer. A mechanical rake connected to a drive or motor is used to move the agglomerated solids at the bottom of the settling zone for discharge therefrom. This movement of the agglomerated magnesium hydroxide solids is effected with minimum or substantially no agitation of the settling zone per se. A baffle positioned closely adjacent to the outlet from the standpipe is employed to arrest the vertical motion of the influent feed emerging from the standpipe and to deflect its path radially and outwardly within the settling zone. The dense underflow is removed through a bottom outlet while a clarified overflow is removed simultaneously from near the top of the separation vessel.

In a first series of tests conducted in a device of this type with a 3.5 inches in diameter settling zone, the deflector or influent feed baffle plate was set at ¼ inch from the inlet feed opening for feed rates of 4 and 5 g.p.m./sq. ft., and varied between ⅛ inch and 1/16 inch for feed rates of 2 g.p.m./sq. ft. A rake was operated at 12 rpm to move the sludge bed for discharge. Betz 1110 was used as the settling aid or flocculating agent.

A 5% magnesium hydroxide-sea water slurry was fed into the device at rates ranging from 2 to 5 g.p.m./sq. ft. with settling aid addition rates varied incrementally from 0.5 ppm to 3 ppm in feed. The results of these tests are set out in Table I:

TABLE I

| Operating Conditions: | Settling Aid - Betz 1110, Addition Point 5 ft. from clarifier inlet; Sludge bed interface - 2⅜ in. above base; Rake Speed - 12 rpm; | | | |
|---|---|---|---|---|
| | | Suspended Solids | | |
| Feed Rate gpm/ft² | Settling Aid Addition, ppm Based on Feed | Under-flow % | Overflow ppm | Deflector Plate Setting, Inches Above Inlet |
| 4 | 3 | 22.1 | 51 | ¼ |
| 4 | 2 | 17.1 | 61 | ¼ |
| 4 | 1.5 | 14.2 | 57 | ¼ |
| 2 | 1.0 | 17.7 | 173 | ⅛ |
| 2 | 0.5 | 10.9 | 388 | ⅛ |
| 2 | 1.5 | 24.4 | 159 | ⅛ |
| 5 | 3 | 19.0 | 136 | ¼ |
| 5 | 3* | 7.6 | 135 | ¼ |
| 5 | 2 | 12.3 | 231 | ¼ |
| 2** | 1.5 | 17.1 | 34 | 1/16 |
| 2** | 1 | 12.4 | 77 | 3/32 |
| 2 | 1.5 | 23.4 | 38 | 1/16 |
| 0.6+ | 17 | 23.8 | 151 | ¼ |

*MRL-295
**Setting Aid addition followed by 12-inch static mixer
+Basic Magnesia underflow as feed to clarifier - 18.6% suspended solids Further effects of variations in feed rate and settling aid dosage were tested and the results of these tests are set forth in Table II:

TABLE II

| Effect of Clairifer Feed Rate on Suspended Solids Separation | | | | |
|---|---|---|---|---|
| Feed Rate gpm/ ft.² | Settling Aid (Betz 1110) Addition Rate ppm on Feed | Underflow Suspended Solids, % | Overflow Suspended Solids, ppm | Overflow Rate, Vol. % of Feed |
| 2 | 1.5 | 17.1 | 34 | — |
| 2 | 1.5 | 23.4 | 38 | — |
| 2 | 1.5 | 24.4 | 159 | 82 |
| 4 | 1.5 | 14.2 | 57 | 66 |
| 4 | 2 | 17.1 | 61 | 72 |

TABLE II-continued

Effect of Clairifer Feed Rate on Suspended Solids Separation

| Feed Rate gpm/ft.$^2$ | Settling Aid (Betz 1110) Addition Rate ppm on Feed | Underflow Suspended Solids, % | Overflow Suspended Solids, ppm | Overflow Rate, Vol. % of Feed |
|---|---|---|---|---|
| 5 | 2 | 12.3 | 231 | 62 |
| 4 | 3 | 22.1 | 51 | 80 |
| 5 | 3 | 19.6 | 136 | 76 |

The data show a marked decrease in suspended solids in the underflow at settling aid concentrations of 1.5 and 2 parts per million when the clarifier feed rate is 4 or 5 g.p.m./sq. ft. At a concentration of 3 parts per million, the suspended solids is much less dependent on feed rate. A relatively large increase in suspended solids in the overflow was obtained in the third run when the deflector or baffle plate was moved from 1/16 inch to ⅛ inch from the inlet. The increase is attributed to poor solids contact when the plate is positioned there.

The effect of various settling aid concentrations at fixed feed rates was also measured. The results are recorded in Table III:

TABLE III

Effect of Settling Aid Addition Rate on Suspended Solids Separation

| | Underflow, % Susp. Solids | | | | | Overflow, ppm Susp. Solids | | | | |
|---|---|---|---|---|---|---|---|---|---|---|
| Feed Rate, gpm/ft$^2$ | Settling Aid (Betz 1110) Addition Rate, ppm. Based on Feed | | | | | | | | | |
| | 0.5 | 1 | 1.5 | 2 | 3 | 0.5 | 1 | 1.5 | 2 | 3 |
| 2 | 10.9 | 12.4 | 21.6* | | | 388 | 77 | 77* | | |
| 4 | — | — | 14.2 | 17.1 | 22.1 | — | — | 57 | 61 | 51 |
| 5 | — | — | — | 12.3 | 19.6 | — | — | — | 231 | 136 |

*Average from three tests

The data indicate that optimum results are obtained at a feed rate of 4 g.p.m/sq. ft. and 3 ppm of Betz 1110 as settling aid. Under these conditions and with the apparatus as described, an overflow of about 50 ppm and an underflow containing 22% suspended solids are typically obtained. This compares with typical rates of 0.14 g.p.m/sq. ft. and an overflow of 100 ppm. suspended solids achieved by conventional methods.

EXAMPLE 2

In a second series of tests, the effect of settling aid dosage was monitored. In these tests, a similar device with a diameter of 3 feet was used to separate magnesium hydroxide from sea water. Calgon 2400 was used as the settling aid in this series of tests. The effect of varying the settling aid dosage is clearly illustrated by the data set forth in Table IV:

TABLE IV

Effect of Settling Aid Dosage

| Feed Solids % | Upflow Rate (gpm/sq.ft.) | Settling Aid Dosage (lbs./ton MgO) | Underflow Solids % |
|---|---|---|---|
| 4.8 | 4 | 0.06 | 12.5 |
| 4.8 | 4 | 0.09 | 16.6 |
| 4.8 | 4 | 0.13 | 21.2 |
| 4.8 | 4 | 0.16 | 23.3 |
| 2.6 | 4 | 0.05 | 17.6 |
| 2.6 | 4 | 0.08 | 19.1 |
| 2.6 | 4 | 0.11 | 20.9 |
| 2.6 | 4 | 0.16 | 22.1 |
| 2.6 | 4 | 0.21 | 23.2 |
| 1.4 | 4 | 0.05 | 20.2 |
| 1.4 | 4 | 0.10 | 21.5 |
| 1.4 | 4 | 0.14 | 25.2 |
| 1.7 | 4 | 0.12 | 24.4 |
| 1.7 | 4 | 0.16 | 26.5 |
| 1.7 | 4 | 0.20 | 27.1 |
| 1.7 | 2 | 0.03 | 18.7 |
| 1.7 | 1.6 | 0.10 | 24.3 |
| 1.7 | 1.8 | 0.18 | 25.5 |
| 1.7 | 1.8 | 0.30 | 27.7 |
| 2.1 | 2 | 0.04 | 21.0 |
| 1.9 | 2 | 0.07 | 21.9 |
| 2.1 | 2 | 0.10 | 21.1 |
| 2.5 | 2 | 0.04 | 19.8 |
| 2.5 | 2 | 0.06 | 21.0 |
| 2.5 | 2 | 0.11 | 24.5 |

EXAMPLE 3

In another series of tests, calcined dolomite was added to sea water and the mixture was agitated. Fifty five gallon samples of resulting magnesium hydroxide suspension containing about 3–4% suspended solids were withdrawn for future testing. The suspension, containing about 3.5% suspended solids, along with the flocculating agent was fed into a clarifier of the type described hereinabove provided with a 6-inch diameter settling zone. The outlet of the influent feed standpipe was 2½ inches from the base of the device and the upper boundary of the settling zone was 4 inches above the base. The rake was operated at a speed of 8 rpm.

Prior beaker tests indicated that anionic polymers produced well flocculated particles and a clear supernatant while cationic or nonionic polymers had little or no clarifying effect. Betz 1410 was chosen as the most effective settling aid and was used at addition levels of 1.0 to 1.5 ppm by weight. The settling aid was added from stock solutions to the magnesium hydroxide suspension in the feed line from the 55-gallon drums providing the influent feed. The settling aid was added at two different points in the feed line to improve dispersion and a static mixer, 0.5 inches in diameter and 12 inches long was inserted in the feed line after the first addition point.

In the first set of tests performed under these conditions, the effect of feed rate of the suspension on solids separation was measured. Table V summarized the results obtained:

TABLE V
Effect of Feed Rate on Solids Separation

| Susp. Solids % | Rate gpm/ft.² | FLOC (Betz 1410) DOSAGE ppm | FLOC (Betz 1410) DOSAGE lbs/ton of MgO* | UNDERFLOW Susp. Solids % | UNDERFLOW Vol. % of Feed | OVERFLOW Susp. Solids, ppm |
|---|---|---|---|---|---|---|
| 3.5 | 1.5 | 0.95 | 0.08 | 22.5 | 12.6 | 55 |
|  | 2.0 | " | " | 20.6 | 13.9 | 41 |
|  | 3.0 | " | " | 10.6 | 33.8 | 66 |
| 3.6 | 1.5 | 1.43 | 0.12 | 23.2 | 13.4 | 63 |
|  | 2.0 | " | " | 22.8 | 15.0 | 44 |
|  | 2.0** | " | " | 18.6 | — | 31 |
|  | 3.0 | " | " | 12.7 | 27.4 | 46 |
| 3.6 | 2.0 | 1.90 | 0.15 | 23.4 | 11.8 | 48 |
|  | 3.0 | " | " | 16.3 | 22.5 | 24 |

*Based on all solids being Mg(OH)₂
**Results obtained in plant area using small laboratory deaerator.

The data show that, at a constant rate of settling aid addition, as the feed rate increased, underflow density was reduced. Also, polymer dosage must be increased, at higher feed rates, to maintain a relatively high underflow density. A feed rate of 3.0 g.p.m/sq. ft. appeared to be too high for an acceptable underflow density in this tests series. Overflow suspended solids content appeared to be reduced when increasing the feed rate from 1.5 g.p.m./sq. ft. to 2.0 g.p.m/sq. ft. The overflow suspended solids appeared to be fine, coagulated particles which, after mixing the overflow samples, tended to combine into larger fast settling particles. The liquid phase was perfectly clear, visually.

The improvement in overflow quality due to increasing the feed rate was the result of improved particle contact in the sludge bed. At 1.5 g.p.m./sq. ft., the sludge bed was dense and very little movement was noted at the clarifier wall. By adjusting the flow rate and deflector plate gap, channeling in the sludge bed was reduced and random motion of particles in the sludge was increased, resulting in improved overflow quality.

Additional tests were made using the 55 gallon samples to determine the effect of settling aid dosage on solids separatin at different feed rates. The method of adding settling aid remained the same. Results are shown in Table VI:

TABLE VI
Effect of Flocculent Dosage on Solids Separation

| FEED Susp Solids, % | FEED Rate gpm/ft² | FLOC (Betz 1410) DOSAGE ppm | FLOC (Betz 1410) DOSAGE lbs/ton MgO | UNDERFLOW Susp Solids % | UNDERFLOW Vol. % of Feed | OVERFLOW Susp Solids, ppm* |
|---|---|---|---|---|---|---|
| 3.5 | 1.5 | 0.48 | 0.04 | 14.4 | 21.3 | 75(68) |
|  | 1.5 | 0.72 | 0.06 | 19.2 | 12.8 | 51(106) |
|  | 1.5 | 0.95 | 0.08 | 22.5 | 12.6 | 55(45) |
|  | 1.5 | 1.43 | 0.11 | 23.2 | 13.4 | 63(47) |
| 3.6 | 2.0 | 0.70 | 0.06 | 16.1 | 17.8 | 63 |
|  | 2.0 | 0.95 | 0.08 | 20.6 | 13.9 | 41 |
|  | 2.0 | 1.43 | 0.12 | 22.8 | 15.0 | 44 |
|  | 2.0 | 1.90 | 0.16 | 23.4 | 11.8 | 48 |
| 3.6 | 3.0 | 0.95 | 0.08 | 10.6 | 33.8 | 66 |
|  | 3.0 | 1.43 | 0.11 | 12.7 | 27.4 | 46 |
|  | 3.0 | 1.90 | 0.15 | 16.3 | 22.5 | 24 |

*Numbers in parentheses indicate a different method of analysis.

Flocculent dosages are given as ppm by weight on feed and also as lbs./ton MgO based on Mg(OH)₂ in the feed. All tests show that at a constant feed rate, increasing the settling aid addition resulted in increased underflow density and, in general, reduced overflow suspended solids content. The data show that at least 1 ppm was required when operating at 1.5 to 2.0 g.p.m./sq. ft., for acceptable underflow and overflow quality. A further increase in the dosage of settling aid appeared to improve solids separation, but the degree of improvement was not in proportion to the increase in dosage. In other applications it has been found that an addition level is eventually reached, above which no further improvement in solids separation is noted.

At a feed rate of 3.0 g.p.m./sq. ft., underflow density was comparatively low even at a flocculant dosage of 1.9 ppm. Overflow suspended solids content, however, of less than 50 ppm was still obtainable.

The tests indicate that overflow quality is affected by both feed rate and flocculent dosage. At a relatively low feed rate, the condition of the sludge bed contributes to channeling of liquid up through the bed. At relatively higher feed rates, distribution of feed into the sludge bed is improved to promote better solids contact and more uniform sludge bed density. Both of these factors tend to improve overflow quality. Excessive settling aid dosage contributes to channeling because of formation of relatively large flocculated particles resulting in a clumpy-type sludge bed in which channeling could occur. These types of problems would be minimized in a larger diameter device.

It has also been observed that entrained air in the magnesium hydroxide suspension results in relatively higher solids content of overflow. The problem can be overcome by passing the suspension through a conventional deaerator or degasser before feeding it to the clarifier. The flow rate to the degasser must be adjusted so as not to exceed the capacity of the degasser or else there will be little improvement in overflow clarity.

It will be seen from the above description that a highly effective method has been devised for producing and then rapidly recovering magnesium hydroxide from sea water. By means of the present invention, substantial economies may be achieved. For example, in order to process 25,000 gallons per minute of sea water, a single apparatus of about 125 feet in diameter or two devices of about 95 feet in diameter which incorporate the process hereindescribed can replace the series of conventional devices which are 250 to 300 feet in diameter.

While the invention has been described with reference to specific examples disclosed herein, these are to be regarded as illustrative rather than restrictive. The invention is not to be construed as limited to these particular examples.

I claim:

1. A process for producing and rapidly recovering magnesium hydroxide from a magnesium ion-containing aqueous liquid such as sea water and the like, comprising:
    (a) treating said aqueous liquid with lime to react with the magnesium ions in said aqueous liquid to form an aqueous suspension of magnesium hydroxide particles;
    (b) adding about 3 parts per million by weight of an anionic polyelectrolyte to said suspension to bring about at least partial agglomeration of the solid magnesium hydroxide particles in said suspension and thereby form a slurry thereof;
    (c) introducing the resulting slurry as influent feed into a solids settling zone of a separation vessel, at a rate of about 4 gallons per minute per square foot of cross-sectional area of said settling zone, said influent feed being introduced into said settling zone beneath the upper boundary thereof, said settling zone zone containing a previously formed slurry having a higher concentration of agglomerated solid magnesium hydroxide therein than in said influent feed slurry;
    (d) deflecting the path of said influent feed introduced within said settling zone horizontally and radially from the location of influent feed introduction to increase contact between said magnesium hydroxide particles in said influent feed and said agglomerated magnesium hydroxide in said settling zone to bring about additional agglomeration of the magnesium hydroxide particles introduced into said settling zone with said influent feed;
    (e) allowing magnesium hydroxide agglomerates to settle to the bottom of said separation vessel with no additional agitation of the settling zone, save that provided hydraulically by the introduction of the influent feed;
    (f) continuously removing a dense liquid-solids slurry fraction from said settling zone at a rate which maintains the upper boundary of said settling zone substantially stationary and in direct contact with an overlying body of clarified aqueous liquid for overflow; and
    (g) separating the magnesium hydroxide agglomerates from the dense liquid solid slurry fraction removed from said separation vessel.

2. A process as described in claim 1 wherein said magnesium ion-containing aqueous liquid is sea water.

3. A process as described in claim 1 wherein said lime is calcined dolomite.

4. A process as described in claim 1 wherein said magnesium ion-containing aqueous liquid is a brine.

5. A process as described in claim 1 wherein said agglomerated magnesium hydroxide is separated from the dense liquid solids slurry fraction by filtration.

6. A process as described in claim 1 wherein said anionic polyelectrolyte is an anionic polyacrylamide resin.

7. A process in accordance with claim 1 wherein the resulting slurry as influent feed is initially introduced into the solids settling zone of the separation vessel in a vertically upward direction.

8. A process in accordance with claim 1 wherein the resulting slurry as influent feed is initially introduced into the solids settling zone of the separation vessel in a vertically downward direction.

* * * * *